Figure 1:
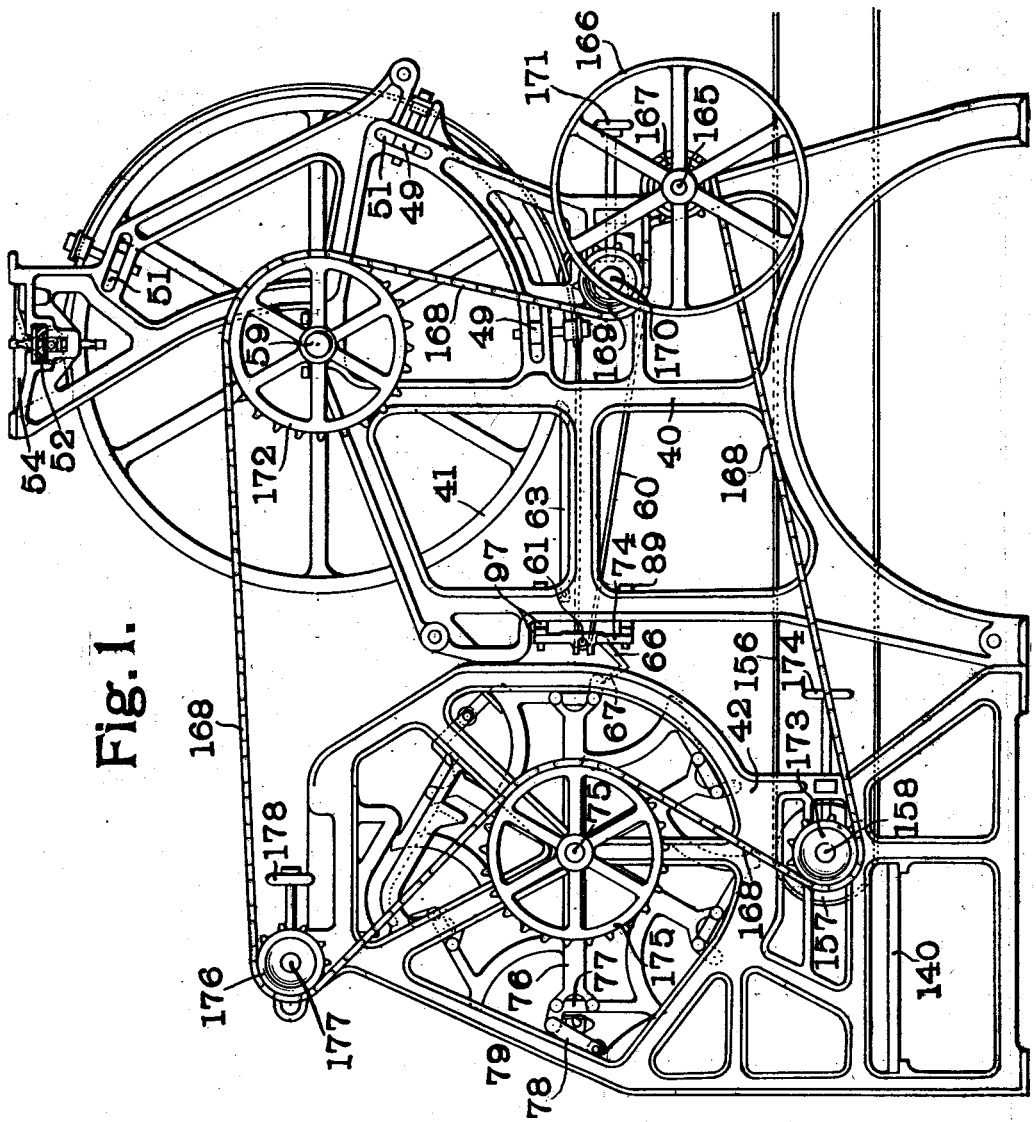

G. H. SCHAETZEL.
PRETZEL MAKING MACHINE.
APPLICATION FILED JUNE 6, 1910.

1,142,533.

Patented June 8, 1915.
9 SHEETS—SHEET 1.

WITNESSES:
L. L. Mead.
W. A. Alexander

INVENTOR
Geo. H. Schaetzel,
BY
Fowler & Huffman
ATTORNEYS

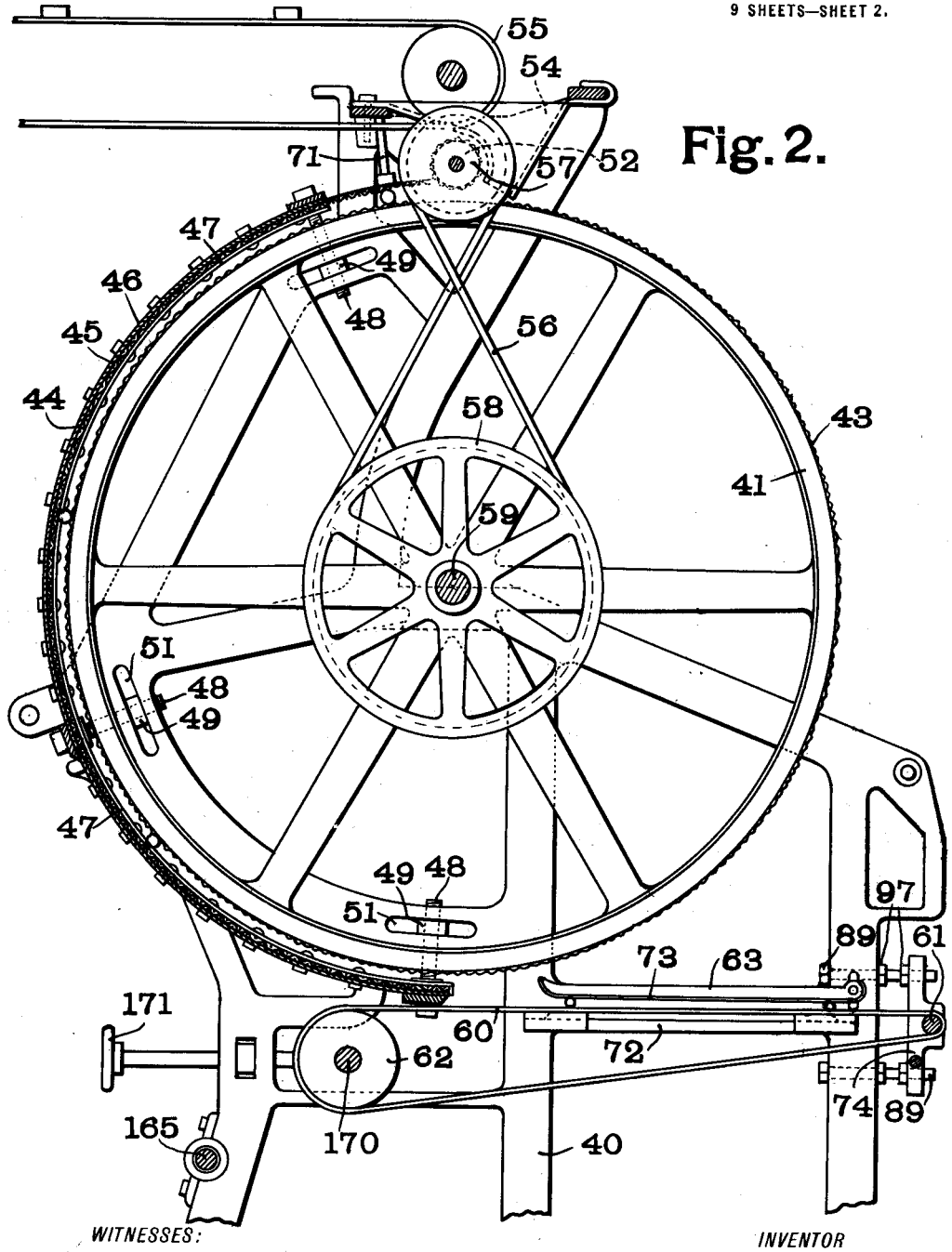

G. H. SCHAETZEL.
PRETZEL MAKING MACHINE.
APPLICATION FILED JUNE 6, 1910.
1,142,533.
Patented June 8, 1915.
9 SHEETS—SHEET 3.
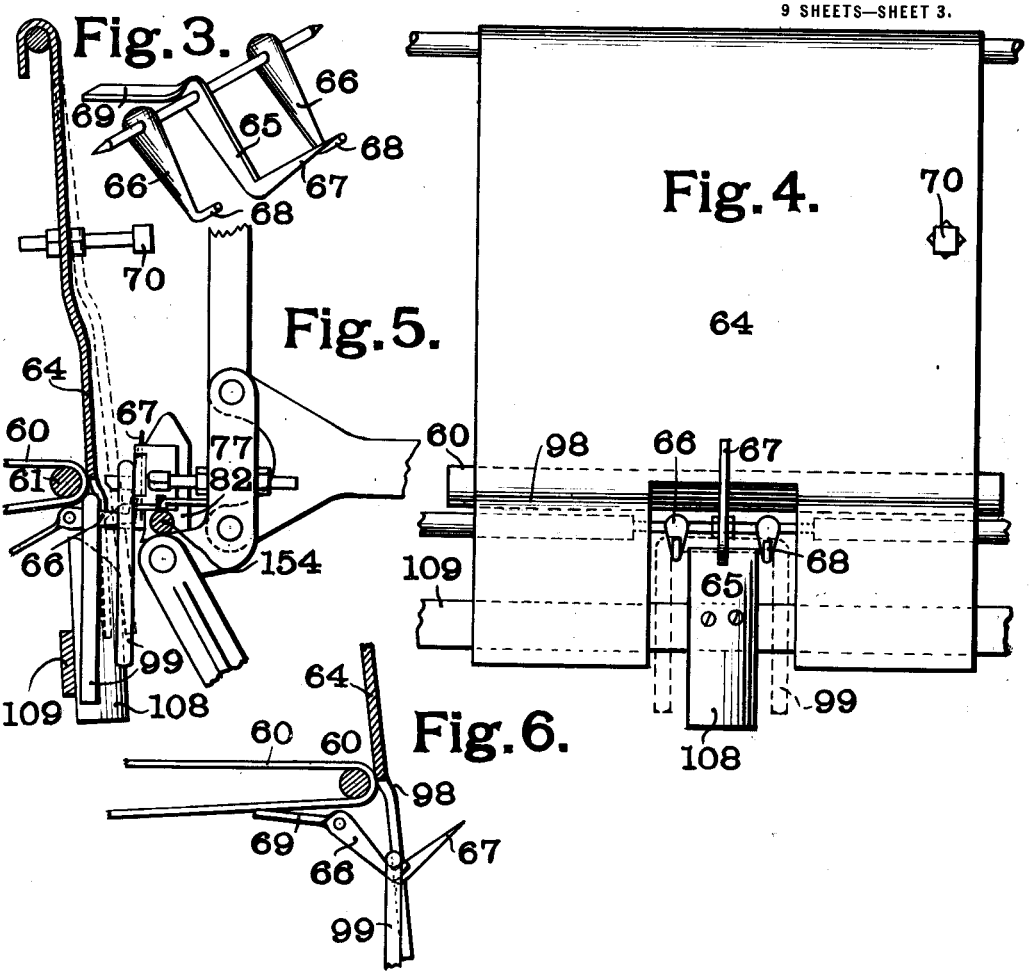
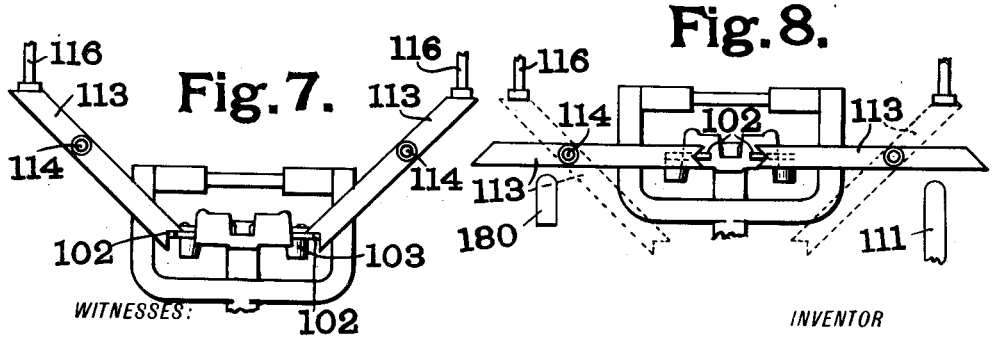
WITNESSES:
L. L. Mead.
W. A. Alexander
INVENTOR
Geo. H. Schaetzel,
BY Fowler & Huffman
ATTORNEYS

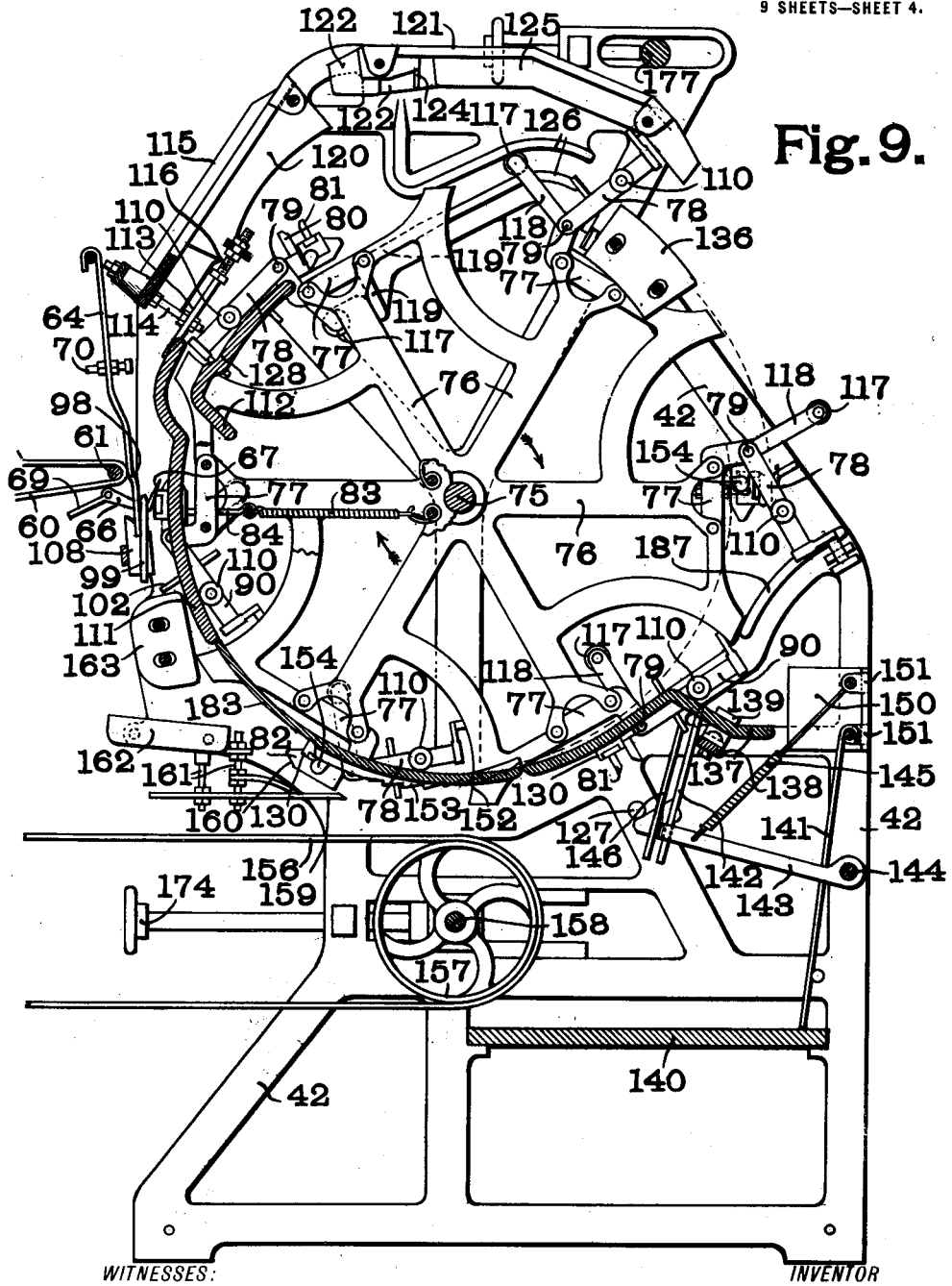

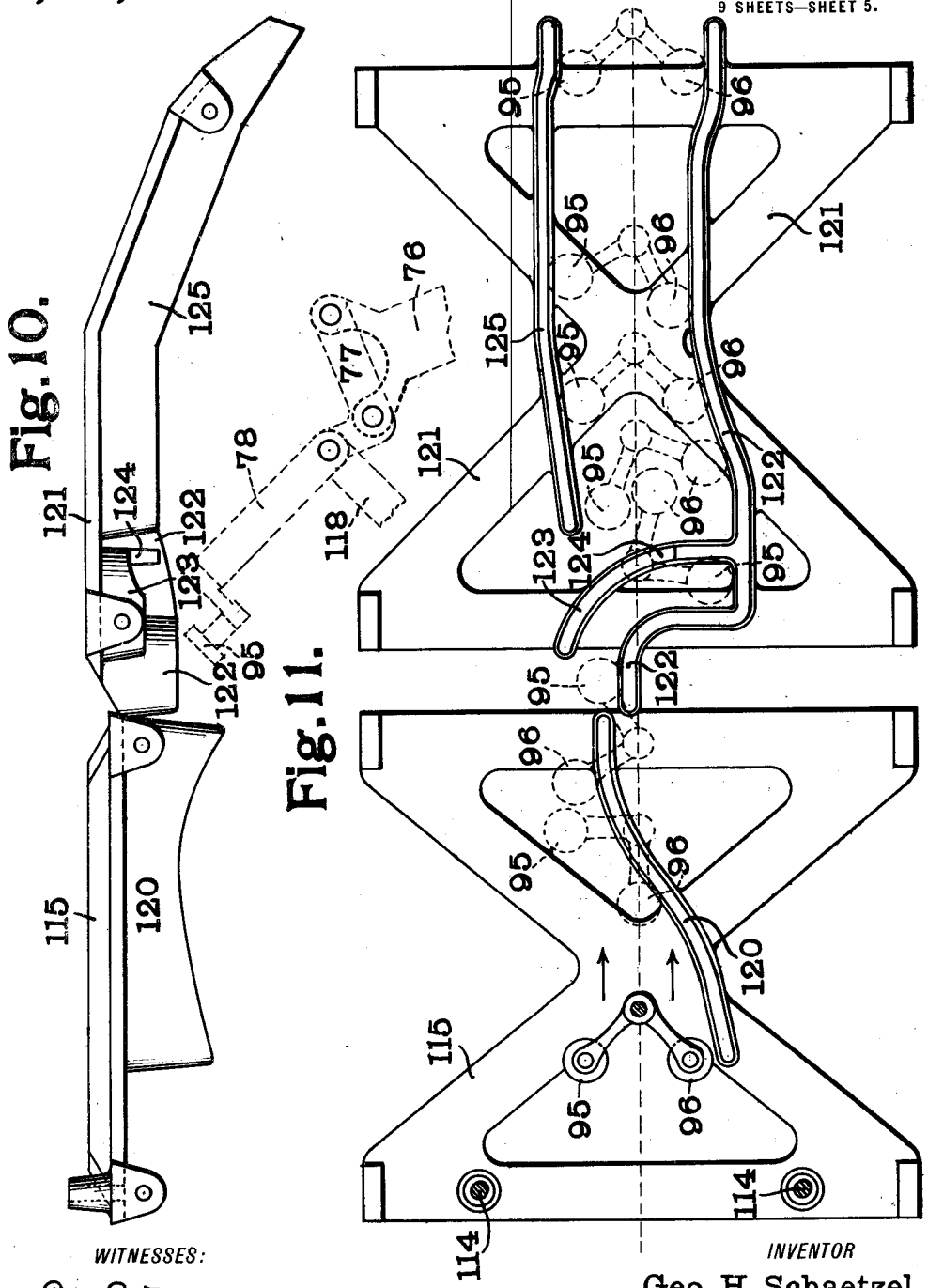

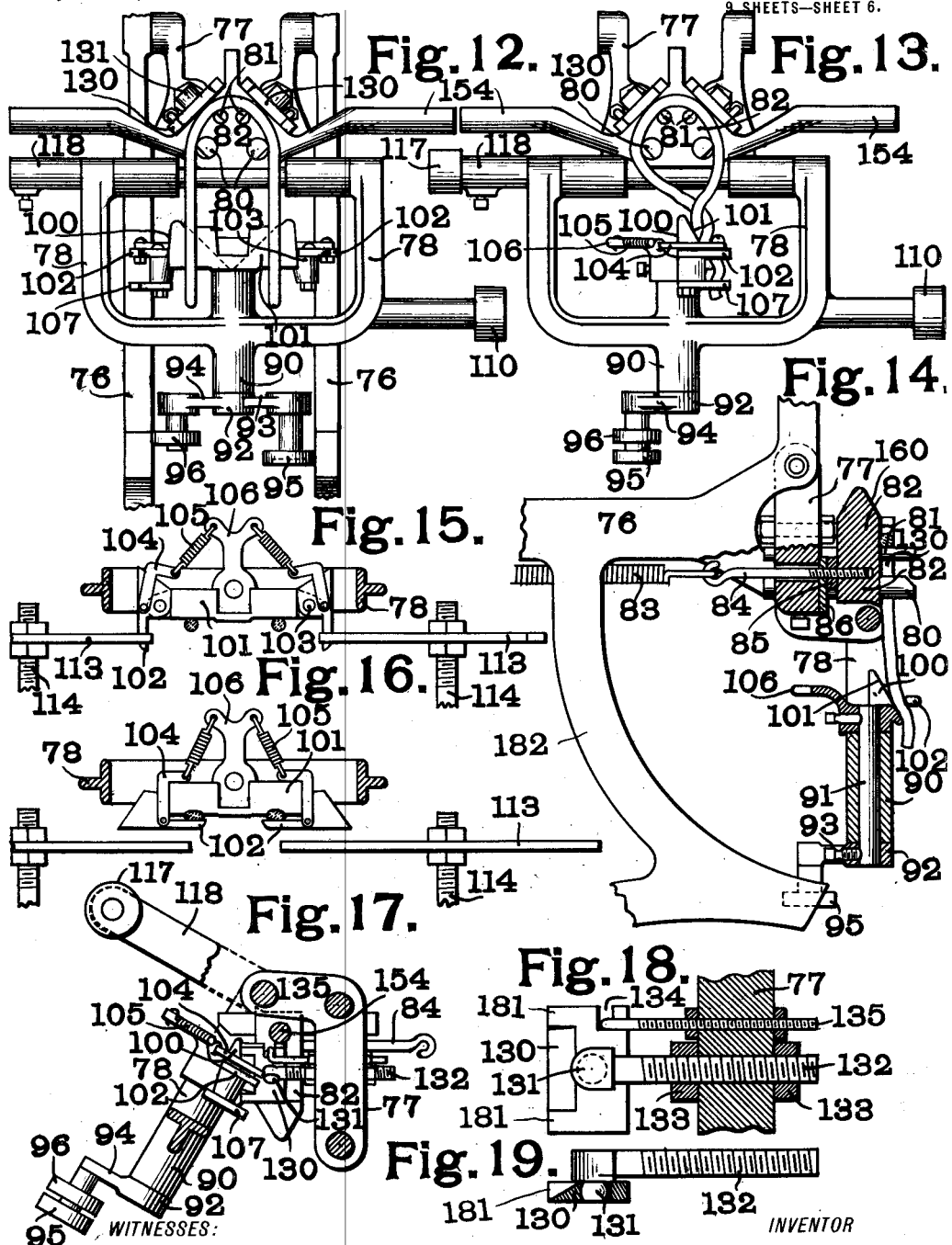

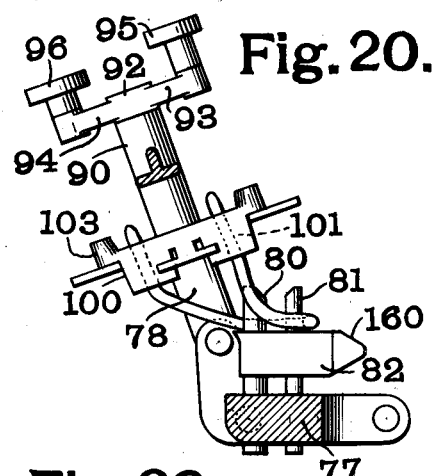
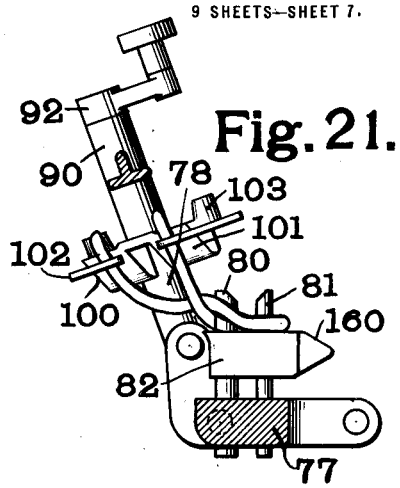
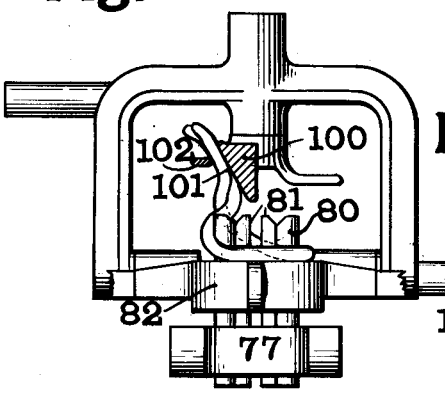
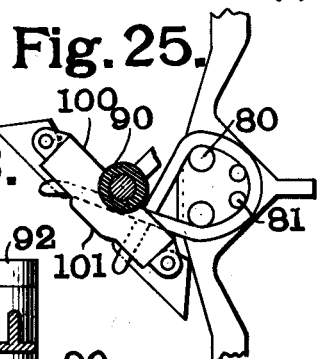
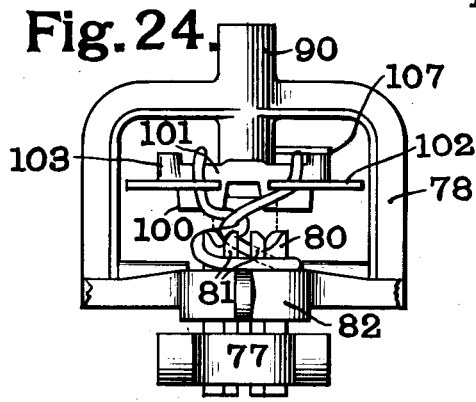
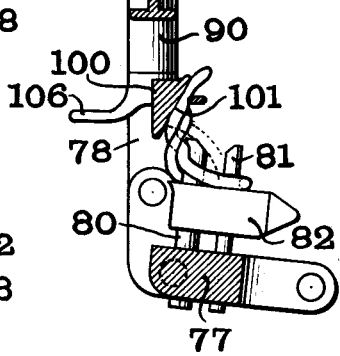

G. H. SCHAETZEL.
PRETZEL MAKING MACHINE.
APPLICATION FILED JUNE 6, 1910.
1,142,533.
Patented June 8, 1915.
9 SHEETS—SHEET 8.
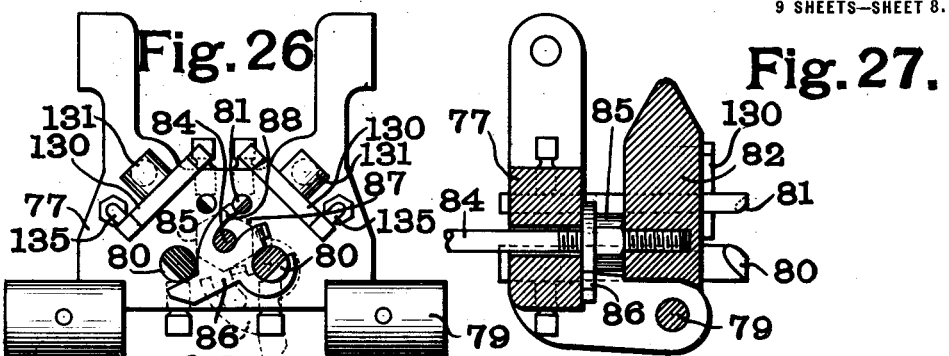
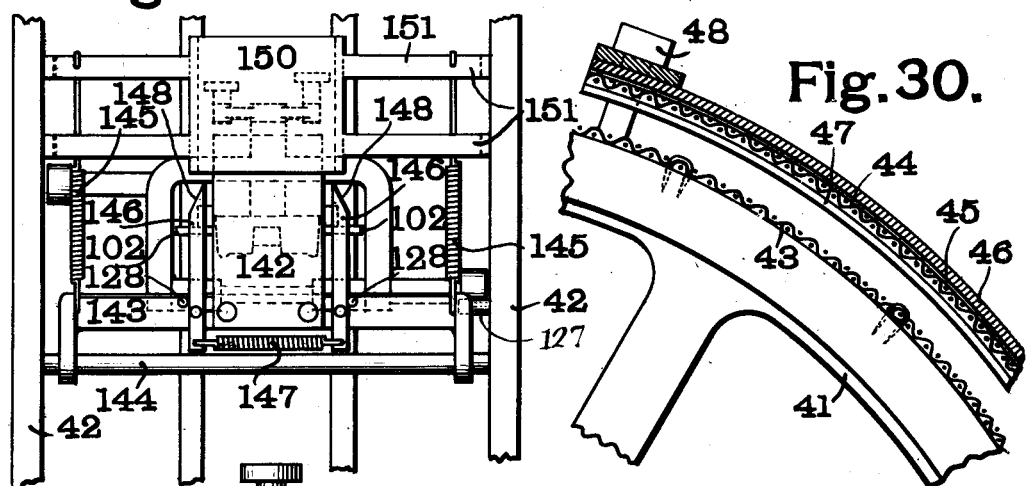
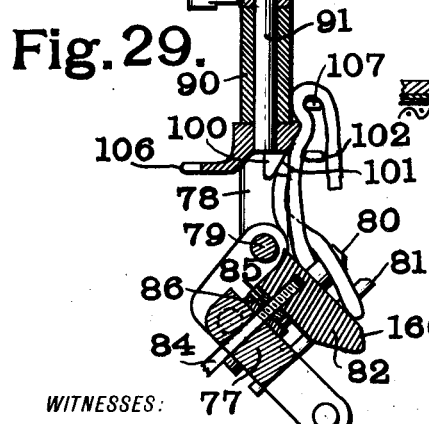
WITNESSES:
L. L. Mead.
W. H. Alexander.
INVENTOR
Geo. H. Schaetzel,
BY Fowler & Huffman
ATTORNEYS

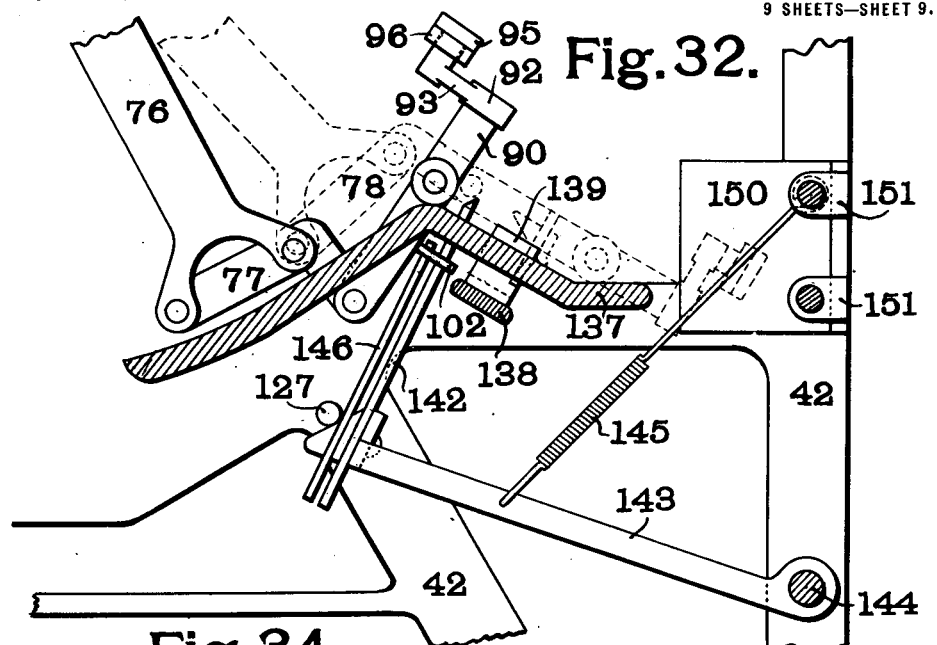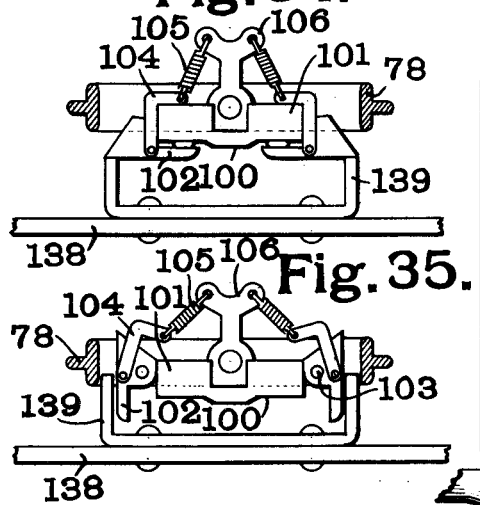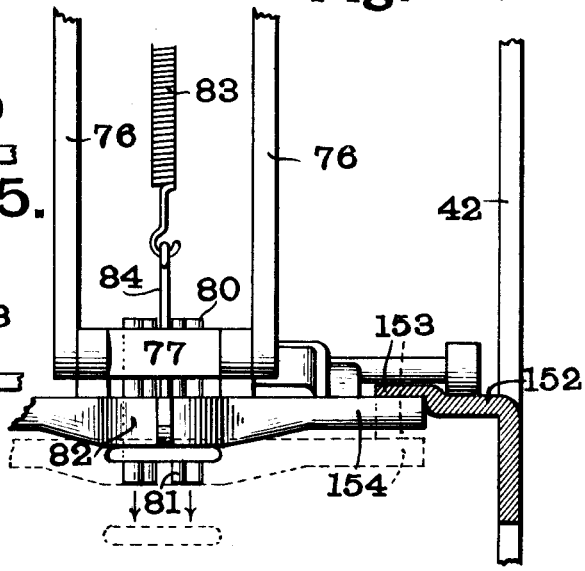

UNITED STATES PATENT OFFICE.

GEORGE H. SCHAETZEL, OF ST. LOUIS, MISSOURI, ASSIGNOR TO PFENNINGER PRETZEL & BAKING COMPANY, OF ST. LOUIS, MISSOURI, A CORPORATION OF MISSOURI.

PRETZEL-MAKING MACHINE.

1,142,533.    Specification of Letters Patent.    Patented June 8, 1915.

Application filed June 6, 1910. Serial No. 565,310.

*To all whom it may concern:*

Be it known that I, GEORGE H. SCHAETZEL, a citizen of the United States, residing at St. Louis, Missouri, have invented a certain new and useful Pretzel-Making Machine, of which the following is such a full, clear, and exact description as will enable any one skilled in the art to which it appertains to make and use the same, reference being had to the accompanying drawings, forming part of this specification.

Heretofore pretzels have either been twisted by hand or when made by machinery have been stamped out of sheets of dough by means of dies. In making pretzels in the last mentioned manner the pretzel lacks the characteristics which are imparted by rolling the dough and furthermore a different kind of dough must be used in order that it does not stick to the die.

The object of my invention is to provide means whereby the ordinary rolled and twisted pretzel may be manufactured entirely by machinery.

In the accompanying drawings which illustrate one form of machine made in accordance with my invention, Figure 1 is a side elevation of the complete machine; Fig. 2 is a vertical central section through the portion of the machine for rolling the dough: Fig. 3 is a perspective view showing the fingers for holding the loop of rolled dough; Figs. 4 and 5 are a front and side view respectively showing the manner of transferring the loop of dough to the twisting mechanism; Fig. 6 is a side view showing the fingers for holding the loop of dough; Figs. 7 and 8 are views showing the mechanism for closing the clamping fingers; Fig. 9 is a vertical central section through the twisting mechanism; Figs. 10 and 11 are a side view and a bottom plan view respectively of the cams for operating the twisting mechanism; Figs. 12 and 13 are plan views of the holder of the twisting mechanism, the parts being shown in different positions; Fig. 14 is a side view partly in section of the parts shown in Fig. 12; Figs. 15 and 16 are views similar to Figs. 7 and 8 but taken at right angles thereto; Fig. 17 is a side view of the clamping and twisting mechanism; Fig. 18 is an enlarged section showing the manner of holding one of the knives for severing the dough; Fig. 19 is a side view partly in section of the knife shown in Fig. 18; Figs. 20, 21, 22, 23 and 24 are side views of the twisting mechanism, the parts being shown in different positions; Fig. 25 is a plan view of the parts shown in Fig. 21; Figs. 26 and 27 are sectional views showing details of construction of the dough holding device; Fig. 28 is an enlarged detail view showing the mechanism for scraping the clamping face and fingers of the twisting device; Fig. 29 is an additional sectional view of the twisting device; Figs. 30 and 31 are enlarged sectional views showing details of the cylinder and concave for rolling the dough; Fig. 32 is an enlarged sectional view of the part shown in Fig. 28; Fig. 33 is an enlarged detail view of the mechanism for ejecting the pretzel from the machine and Figs. 34 and 35 are plan views showing the mechanism for opening the clamping fingers.

Like marks of reference refer to similar parts in the several views in the drawings.

40 represents the frame of the machine which supports a roller 41 for rolling the dough into long slender pieces adapted to form the pretzel. This frame 40 for convenience in manufacture and assembling the machine is preferably made separate from the frame 42 carrying the twisting mechanism. The roll 41 is covered with a wire netting 43. The roll 41 coöperates with a concave having an interior lining 44 of wire netting similar to the netting 43 on the roller 41. This netting 44 is secured to a backing 45 of thin metal as best shown in Figs. 30 and 31. This backing 45 of thin metal is adapted to slip into the space within the supporting portion 46 of the concave. The netting 44 and the backing 45 can be removed together from the concave so that both may be cleaned of any adhering dough. To prevent the sagging of the netting 44 and backing 45 it is preferably held in grooves formed between the backing and strips 47, as best shown in Fig. 31. The part 46 forming the body of the concave may be adjusted toward and away from the roller 41 by means of bolts 48 engaging with adjusting nuts 49. The adjusting nuts 49 are arranged in slots 51 in the frame 40, as best shown in Fig. 2. Arranged at the top of the roll 41 is a smaller roll 52 which is also covered with wire netting. A hopper 54 is provided for guiding the lumps of dough to the space between the rollers 41 and 52. The dough is fed into the hopper 54 by means of an endless belt conveyer 55 as shown in Fig. 2. The lumps of dough may be of any suitable form but are preferably approximately cubical. The roll 52 is driven at a considerable less peripheral speed than the roll 41. It is driven by means of a belt 56 passing over a pulley 57 on the said roll 52 and a pulley 58 on the shaft 59 of the roll 41. Owing to the difference in speed between the rolls 52 and 41 the lumps of dough are oppositely drawn between the two rolls and at the same time given a rolling motion to form them into cylindrical pieces which will pass between the netting 44 and the roll 41. The netting 44 together with its backing 45 extends beyond the concave 46, as best shown in Fig. 2, and the projecting part is supported by an adjustable rod 71. By adjusting the rod 71 the space between the roll 41 and the netting 44 for receiving the dough can be regulated. The dough in passing between the netting 44 and the roll 41 is rolled out into a long slender cylinder which is deposited upon a belt 60 passing around a small roller 61 and a larger roller 62. Arranged above this belt 60 is a smoothing board 63 and below it a support 72. While the purpose of the board 63 is to smooth out the coarse markings made on the dough by the wire netting, it must not be too smooth or the dough will fail to roll between it and the belt 60. In order to give the lower face of the board 63 the proper surface I cover it with cotton belting 73 which has sufficient teeth to engage the dough but at the same time will remove the rough markings made by the wire netting. When the strip of dough reaches the end of the belt 60 it strikes against a swinging plate 64 and falls down between the end of the conveyer 60 and the said plate 64 on to fingers 65 and 66 shown in detail in Fig. 3. The central finger 65 is provided with a long point 67 while the side fingers 66 are provided with shorter points 68. These fingers normally stand in an inclined position as shown in Fig. 6, the movement of the fingers being limited in one direction by means of a tail-piece 69 formed on the central finger 65 and striking against the lower strand of the belt or conveyer 60, as shown in Fig. 6 and in the opposite direction by the part 108. The fingers normally stand at an angle so that the roll of dough will slide down against the upturned ends, as shown in Fig. 6, but are raised into horizontal position as will be hereinafter described when the rolls are to be removed. The forward movement of the plate or apron 64 is limited by means of set screws 70 adapted to strike against the frame 42, as best shown in Fig. 9. The movement of the plate in the opposite direction is limited by the roll 61. In order to adjust the roll 61 and plate 64 toward and away from the twisting mechanism the said roll 61 is carried in bearings 74 adjustably secured to the frame 40 by means of bolts 89 and nuts 97. The apron 64 is provided with an offset or bend 98 (see Figs. 4 and 6) to prevent any possibility of the loops of dough 99 being pressed between the roller and the upper end of the fork by the return movement of the plate. The rolls or loops of dough after being deposited upon the fingers 65 and 66 are next engaged by the twisting mechanism which will now be described.

Mounted in the frame 42 is a shaft 75 upon which are mounted side frames 76 forming a rotary member for carrying the various twisting devices. These twisting devices may be of any suitable number. In the drawings I have shown the machine as provided with six of them. Each of the twisting devices consists of a base piece 77 (see Figs. 12, 13, 14 and 17) secured to one of the arms of the rotary member 76 and a frame 78 pivoted at 79 to the said base 77. Carried by the base 77 are two large pins 80 and two small pins 81, best shown in Figs. 12 and 13. These pins 80 and 81 form a support around which the loop of dough is placed to form the same into a pretzel. The pins 80 and 81 are surrounded by means of a block 82 forming an ejector. This block 82 is normally held toward the base 77 by means of a coil spring 83 attached to a pin 84 secured to the block 82, as best shown in Fig. 14. The pin 84 is surrounded by a nut 85 adapted to strike against the base 77, as best shown in Fig. 27. In order to vary the distance between the base 77 and the block 82 when in its normal position, a pivoted member 86 is provided which is adapted to be swung between the nut 85 and the base 77, as shown in Figs. 26 and 27. This member 86 is provided with a slot 87 adapted to pass around the pin 84 and is also provided with a projecting portion 88 adapted to strike against one of the pins 81. When the member 87 is swung out into the position shown in dotted lines in Fig. 26 the nut 85 is allowed to come in contact with the base 77 so that the block 82 may be drawn closer to the base 77 by means of the spring 83 for purposes to be hereafter described. The frame 78 is provided with a bearing 90 in which is mounted a rod 91, best shown in Figs. 14 and 29. This rod 91 is provided at its outer end with a collar 92 carrying arms 93 and 94 carrying rollers 95 and 96 respectively. The roller 95 projects beyond the roller 96, as best shown in Fig. 12. These rollers 95 and 96 are adapted to coöperate with suitable cams as will hereinafter be more fully described in order to rotate the clamping mechanism which is carried at the inner end of the rod 91. This clamping mechanism comprises a block 100 having an inclined face 101. Against this inclined face 101 the ends of the loop of dough to form the pretzel are adapted to be clamped by means of fingers 102 pivoted to the said block 100 at 103, as best shown in Figs. 15 and 35. The fingers 102 have attached to them bent links 104 which are attached by means of springs 105 to a projection 106 on the rear of the block 100 so that the fingers will be held either in their open or closed positions by means of said springs 105. In addition to the fingers 102 one side of the block 100 is preferably also provided with an additional finger 107 for supporting one end of the loop of dough as will be hereinafter more fully described. After the loop of dough has been deposited upon the fingers 65 and 66 as hereinbefore described, the projecting portion 67 of the central finger 65 is struck by the ejector block 82 so that the fingers are raised up into the position shown in Fig. 5, the bodies of the fingers being substantially horizontal.
In this position the fingers can pass the ejector block 82, the central finger 65 passing between the pins 80 and 81. The pins 81 come in contact with the loop of dough carried by the fingers and raise the loop from the fingers, as best shown in Fig. 5. These pins 81 are of such length that if two loops of dough should by any chance rest on the fingers at the same time only one loop will be picked up, as clearly shown in Fig.
5. The ends of the loop of dough are prevented from striking together by means of a block 108 carried on a crosspiece 109 as best shown in Figs. 4 and 5.

While the loop of dough is being raised from the fingers 65 and 66 the frame 78 is held in a retracted position by means of a roller 110 carried by the said frame and engaging with the interior of a cam track 111, as best shown in Fig. 9. The frame is held in such position that the inclined face 101 of the clamping block will be in the path of the finger 65 as said finger drops from its horizontal position. The face 101 thus serves to retard the fall of the finger and thus obviates the possibility of one roll of dough falling on top of another as might occur if one roll of dough was fed to the fingers while another was held on the fingers if the fall was not retarded. This would result in the two rolls being taken up and twisted together. After the base 77 with its attached parts has passed beyond the fingers 65 and 66, the roller 110 comes in contact with a second cam track 112 which serves to throw the frame 78 outwardly so that the fingers 102 are engaged by pivoted arms 113 as best shown in Figs. 7, 8, 15 and 16. These arms 113 are pivoted on rods 114 carried in a casting 115 which also carries cam tracks as will be hereinafter more fully described. The arms 113 strike against stops 116 carried by the frame 42 so that the arms are retained in the proper position to engage with the fingers 102. The movement of the arms 113 in the opposite direction is limited by the end of the cam track 111 on one side of the frame 42 and on the other by a stop 180, (see Fig. 8). When the fingers 102 are closed by means of the arms 113 they firmly clamp the ends of the loop of dough against the clamping face 101 of the block 100. The cam track 112 is provided with a recess 128 which allows the frame 78 to fall back to clear the arm 113 after the fingers 102 are closed. After the arms 113 have been passed by the frame 78 a roller 117 carried on an arm 118, arranged at the opposite side of the frame 78 from the roller 110, comes in contact with a cam track 119 so that the frame 78 is thrown outwardly until the roller 96 engages with a cam track 120 carried on the casting 115. The engagement of the roller 96 with the cam track 120 causes the spindle 91 to be rotated and consequently to rotate the block 100 to which the ends of the loop of dough are attached. Arranged upon a casting 121 adjacent to the casting 120 is a cam track 122 having a branch 123 provided with a cut-away portion 124 as best shown in Fig. 10. Just before the roller 96 passes out of engagement with the cam track 120 the roller 95 engages with the track 122 and also with its branch 123. As is shown in Fig. 12, the roller 96 does not project beyond the frame 78 as far as the roller 95 and hence passes below the branch 123 of the track 122. These cams continue the rotation of the spindle 91. As the spindle rotates the roller 95 is lowered owing to the inclined position of the spindle so that the roller 95 drops sufficiently to allow it to pass through the cut-away portion 124 of the track 123. After the roller 95 has passed from engagement with the branch 123 of the track 122 it comes into contact with a cam track 125 at the same time that the roller 96 enters into engagement with the track 122. A complete rotation of the spindle 91 is thus secured and consequently a complete twist is made in the ends of the loop of dough, as best shown in Fig. 24. As the clamping block 100 is rotated one end of the loop of dough 99 will be swung over the block if the ends are of abnormal length while the other will tend to fall down in front of the block. If the first mentioned end is of abnormal length no harm is done. In case the latter mentioned end is of considerable length it would fall against and adhere to the body of the loop thus deforming the pretzel if not prevented. It is for the purpose of supporting any such ends that the auxiliary finger 107 will support the end and prevent its coming in contact with the body of the dough.

In order to enable the twisted portion of the dough to be folded over without coming in contact with the pins 80 and 81 (Fig. 23) it is necessary to slightly over-rotate the spindle 91. This is accomplished by the bends in the tracks 122 and 125 as shown in Fig. 11. This slight overrotation changes the position of the crossing ends of the pretzel so as to throw the rear strand slightly forward and the front strand slightly to the rear and thus permit them to pass down between the pins 80 and 81 as shown in dotted lines in Fig. 23, without striking them as it would be liable to do if not over-rotated. While the spindle is held in this slightly over-rotated position, the roller 117 is moved by means of the cam 119 and a second cam 126 so as to fold the frame 78 over against the ejector block 82, as best shown in Fig. 17. This folding of the frame 78 over the ejector block folds the twisted ends of the loop of dough over the body of the loop so as to form the dough in the shape of the usual hand-twisted pretzel. Owing to the fact, however, that it is impracticable with the machine to secure the ends of the loop of uniform length it is necessary to sever the ends. In order to accomplish this I provide the base 77 with a pair of knives 130 each secured by a ball and socket joint 131 with a threaded rod 132 passing through the base 77 and secured by means of nuts 133, as best shown in Fig. 18. The ball and socket joints 131 allow the knives to adjust themselves to the face 101 of the clamping block 100 so as to insure the proper severing of the dough at all times. It is necessary, however, to prevent too great a movement of the knives 130 and I provide each of the knives with a short slot 134 which engages with the end of a pin 135 carried in the base 77. The end of this pin 135 is slightly less in width than the slot 134 so as to allow of a limited movement of the knife 130. The knives 130 are each provided with a square end 181 which form wearing surfaces which limit the movement of the knives and thus protect the edge which would otherwise soon be dulled by contact with the block 100. In order to prevent the entire weight of the frame from being at once thrown against the knives when the frame is folded over, I provide a cam 136 which is adapted to engage with the roller 110 and thus allow the clamping block to descend gradually and hold the knives slightly out of contact with the face of the block 100. As soon as the roller 110 reaches the end of the cam 136 the frame is allowed to drop slightly so as to bring the knives firmly against the block 100 thus completely severing the ends of the dough. Some little time is necessary for the ends to adhere to the body of the loop. This time is secured while the frame is moving from the cam 136 until the roller 117 comes in contact with a cam track 187 which swings the frame 78 away from the clamping base 77 and the knives carried thereby. The rolls 110 then come in contact with a cam track 137. Arranged adjacent to the cam track 137 is a cross-bar 138 carrying a U-shaped member 139 which is adapted to engage with the ends of the clamping fingers 102 and move the fingers away from the clamping face 101, as best shown in Figs. 34 and 35. The several ends of the dough are thus released and allowed to fall down upon the table 140. A guard-plate 141 is preferably provided in order to prevent the pieces of dough from falling out at the front of the machine.

In order to remove any of the pieces of dough which might adhere to the face 101 I provide a scraper blade 142 which is carried upon a U-shaped member 143 pivoted to a bar 144 and normally held in raised position against the stop 127, by means of springs 145, as best shown in Figs. 28 and 32. As the frame 78 is thrown from the position shown in dotted lines in Fig. 32 to that shown in full lines it will be evident that the face of the clamping block 101 will be drawn across the edge of the knife 142 so as to remove any adhering dough from the face of the said block. About the same time the fingers 102 are engaged by a pair of finger cleaning blades 146 which are pivoted to the U-shaped member 143 hereinbefore referred to. The lower ends of these finger cleaning blades 146 are drawn against stops 128 by means of a spring 147 so as to force the upper ends of the blades firmly against the inner sides of the fingers 102 as the fingers are drawn past the cleaning blades. The upper ends of the cleaning blades are beveled, as shown at 148 in Fig. 28, so as to insure the passage of the blades between the fingers. The movement of the frame 78 in passing the fingers is such that the fingers are drawn downward and away from the blades 146 at the same time, thus effectively cleaning the fingers of any pieces of dough which might adhere thereto. Adjacent to the cam track 137 is a pair of guide-plates 150 carried by cross-bars 151 which also support the guard-plate 141 and the springs 145 hereinbefore referred to. These guide-plates 150 engage with the rolls 95 and 96 so as to prevent the rotation of the spindle while the frame 78 is in the position shown in Fig. 32. After the clamping face and fingers have been cleaned the frame 78 is held in its retracted position by means of the engagement of the roller 110 with the annular continuation 152 of the track 137. Adjacent to the continuation 152 of the track 137 is a notched track 153 which engages with the arms 154 formed on the ejector block 82. The engagement of these arms with the teeth of the track 153 causes an upward and downward movement of the ejector block 82 so as to loosen and eject the pretzel, and force the face of the ejector block completely beyond the pins 80 and 81. At the end of the toothed part of the track 153 is a straight portion which is of sufficient height to retain the face of the ejector block in its position completely beyond the pins 80 and 81 and thus hold the block in position to be scraped. The pretzel falls upon an endless belt or carrier 156 passing around a pulley 157 on a shaft 158 and is carried to any suitable point.

In order to remove any traces of dough which might adhere to the face of the ejector block 82 I arrange adjacent to the path of said block a scraping blade 159 which blade is adapted to scrape the face of the block 82. The block 82 is provided with an inclined forward end 160 so as to insure the proper engagement of the knife with the face of the blade. The knife is adjusted by means of screws 161 preferably carried by means of a pan 162 which is adapted to contain oil for oiling the face of the ejector block 82 and all parts coming in contact with the dough.

As it is only necessary to oil the parts at considerable intervals of time I do not provide automatic means for oiling the parts but depend upon oiling the parts by hand. An oiling cam 183 arranged just beyond the ejector cam 153 holds the ejector block in proper position to allow the various parts to be oiled.

Adjacent to the pan 162 is a cam 163 which is adapted to strike the ejector arms 154 and force the ejector into normal position in case the spring 83 should fail to retract it. The parts are now all in their normal position and the pins 81 are ready to receive another loop of dough from the fingers 65 and 66. While the frame 78 is swung inwardly the block 100 is prevented from rotation by the engagement of the rolls 95 and 96 with the curved track 182 formed integral with the frame 76.

In order to drive the various rotating parts above described, the frame 40 is provided with a shaft 165 upon which is mounted a pulley 166 driven from any suitable source of power. Secured to the shaft 165 is a sprocket wheel 167 around which passes a sprocket chain 168. This sprocket chain 168 also passes around a sprocket wheel 169 mounted on a shaft 170 carrying a roller 62 hereinbefore referred to. The bearings of the shaft 170 may be adjusted by means of a hand-wheel 171 in order to take up the slack in the belt or conveyer 60. The sprocket chain 168 also passes around a sprocket wheel 172 of the shaft 59 carrying the roll 41. Passing in the opposite direction from the sprocket wheel 167 the sprocket chain 168 passes around a sprocket wheel 173 mounted on the shaft 158 carrying pulley 157. The bearings carrying this shaft 158 are adjustable by means of hand-wheels 174 so as to tighten the belt or conveyer 156. After passing around the sprocket wheel 173 the chain 168 passes around a sprocket wheel 175 on the shaft 75 carrying the main rotating member 76. Arranged between the sprocket wheels 172 and 175 is a sprocket wheel 176 which forms an idle wheel for taking up the slack in the chain 168. This wheel 176 is mounted upon a shaft 177 adapted to be adjusted by means of a hand-wheel 178. It will be evident that by the above arrangement all the main rotating parts of the machine are driven by means of the single sprocket chain 168 and at the same time the necessary provision is made for tightening the slack not only in this chain but in the conveyers 60 and 156 driven therefrom.

It will be observed that the face of the ejector block 160 stands at some distance from the edge of the knives so that the ends of the dough will not be unnecessarily flattened when they are cut off. This distance can be varied by the pivoted member 86 as hereinbefore described in order to adapt the machine to handle rolls of dough of different diameter.

The operation of the machine briefly is as follows: The dough after being rolled between the cylinder 43 and concave 44 is delivered by means of the endless carrier 60 to the fork comprising the fingers 65 and 66. The roll of dough is formed into a loop by dropping upon these fingers and is lifted therefrom by means of the pins 80 and 81 when the frame 77 is moved past the said fingers by the rotary member 76. After the loop of dough is secured on the holder the clamping fingers 102 are forced in against the ends of the loop by the engagement of said fingers by the members 113. As the holder passes around the machine the wheels 95 and 96 engage with the tracks 120, 122, 123, and 125, so as to rotate the holder and thus twist the ends of the loop to form the pretzel. As has been previously described, the twisting frame is rotated through slightly more than a complete revolution so that when it is folded over against the body of the holder the loop will not strike against the ends of the pins. After passing the ends of the pins the twisting frame revolves backward so that on being lowered against the knives it occupies the same position it would have occupied if not over-rotated. When the folding frame moves over against the body of the holder the knives 130 sever the ends of the loop of dough about the same time the folded ends are held against the body of the loop until the parts are firmly attached to each other. As the holder passes on around the machine the pivoted frame is again moved away from the body of the holder and the clamping fingers 102 are engaged and released by means of the part 139 allowing the severed ends to fall down on the support 140. After the severed ends are released the ends of the arms 154 engage with the toothed rack 153 so as to impart a series of movements to the ejector which ejects the pretzel from the holder and at the same time cleans any adhering dough from the pins 80 and 81. After the pretzel is ejected from the holder and while it is held in its outer position the face of the ejector is scraped by means of the knife 159. After being scraped by the knife 159 the ejector returns to its normal position and is in readiness to repeat the cycle of operations above described. It will be evident that each of the holders will thus form one pretzel during each revolution of the machine.

Having fully described my invention, what I claim as new and desire to secure by Letters Patent of the United States, is:

1. In a machine for making pretzels, the combination with a traveling holder adapted to engage and hold the body of a loop of dough, of a twisting device traveling with said holder and adapted to twist together the two ends of a loop of dough carried by said holder.

2. In a machine for making pretzels, the combination with a plurality of rotating holders, each adapted to engage and hold the body of a loop of dough, of a plurality of twisting devices rotating with said holders and adapted to twist the ends of the loop carried thereby.

3. In a machine for making pretzels, the combination with a plurality of traveling holders, each adapted to engage and hold the body of a loop of dough, of a plurality of twisting devices traveling with said holders and adapted to twist the ends of the loops of dough carried by said holders and fold the same over the body of the loop.

4. In a machine for making pretzels, the combination with a plurality of rotary holders, each adapted to engage and hold the body of a loop of dough, of a plurality of twisting devices rotating with said holders and adapted to twist the ends of the loops of dough carried by said holders and fold the same over the bodies of the loops.

5. In a machine for making pretzels, the combination with a holder adapted to hold a loop of dough, of means for twisting the ends of the loop together and folding the ends of the loop over the body, and means for severing the ends of the loop.

6. In a machine for making pretzels, the combination with a movable member, of a plurality of holders carried by said member and each adapted to hold a loop of dough, means for twisting the ends of the loops and folding the twisted ends over the bodies of the loops, and means for severing the ends.

7. In a machine for making pretzels, the combination with a rotary member, of a plurality of holders carried by said member and each adapted to hold a loop of dough, means for twisting the ends of the loops and folding the twisted ends over the bodies of the loops, and means for severing the ends.

8. In a machine for making pretzels, the combination with a holder adapted to receive a loop of dough, of clamping means for the ends of the loop, means for twisting the ends of the loop and folding the twisted ends over the body of the loop, means for releasing said clamping means, and an ejector for discharging the loop from said holder after said clamping means are released.

9. In a machine for making pretzels, the combination with a holder adapted to hold a loop of dough, of means for twisting the ends of the loop and folding the twisted ends over the body of the loop, means for severing the ends, and means for ejecting the pretzel from the holder.

10. In a machine for making pretzels, the combination with a movable member, a holder carried thereby and adapted to carrying the body of a loop of dough, a rotary clamping device for twisting the ends of the loop, and a frame pivoted to said holder for folding the twisted ends over the body of the pretzel, said frame carrying said clamping device.

11. In a machine for making pretzels, the combination with a movable member, of a holder carried by said movable member and adapted to carrying the body of a loop of dough, a rotary clamping device for twisting the ends of the loop, a frame pivoted to said holder for folding the twisted ends over the body of the pretzel, said frame carrying said clamping devices, and an ejector carried by said holder.

12. In a machine for making pretzels, the combination with a movable member, of a holder carried by said member and adapted to hold a loop of dough, a frame pivoted to said holder, a rotating clamping device carried by said frame, and knives carried by said holder and adapted to coöperate with said clamping device to sever the ends of the dough.

13. In a machine for making pretzels, the combination with a movable member, of a holder carried by said member and adapted to hold a loop of dough, an ejector movable relatively to said holder, a frame pivoted to said holder, a rotating clamping device carried by said frame, and knives carried by said holder and adapted to coöperate with said clamping device to sever the ends of the dough.

14. In a machine for making pretzels, the combination with a movable member, of a holder adapted to hold a loop of dough, a frame pivoted to said holder, a clamping device carried by said frame, and a knife pivoted to said holder and coöperating with said clamping device to sever the ends of the dough.

15. In a machine for making pretzels, the combination with a movable member, of a holder adapted to hold a loop of dough, a frame pivoted to said holder, a clamping device carried by said frame and a knife pivoted to said holder by a universal joint and coöperating with said clamping device to sever the ends of the dough.

16. In a machine for making pretzels, the combination with a movable member, of a holder adapted to hold a loop of dough, a frame pivoted to said holder, a clamping device carried by said frame, a knife pivoted to said holder by a universal joint and coöperating with said clamping device to sever the ends of the dough, and means for limiting the movement of said knife on its pivot.

17. In a machine for making pretzels, the combination with a holder adapted to hold a loop of dough, of a clamping device, and means for scraping the faces of the clamping device.

18. In a machine for making pretzels, the combination with a movable member, of a holder carried by said member and adapted to hold a loop of dough, an ejector movable relatively to said holder, a frame pivoted to said holder, a clamping device rotatably carried by said frame, and means for scraping the face of said clamping device 19. In a machine for making pretzels, the combination with a holder adapted to hold a loop of dough and provided with clamping fingers, of means for scraping said clamping fingers.

20. In a machine for making pretzels, the combination with a movable member, of a holder carried by said movable member, an ejector movable relatively to said holder, a pivoted frame carried by said holder, a clamping device rotatably carried by said frame and provided with clamping fingers, and means for scraping said clamping fingers.

21. In a machine for making pretzels, the combination with a holder for the pretzel, of an ejector moving relatively to said holder, and means for scraping said ejector.

22. In a machine for making pretzels, the combination with a movable member, of a holder carried by said member, an ejector movable relatively to said holder, and means for scraping the face of said ejector.

23. In a machine for making pretzels, the combination with a movable member, of a holder carried by said member provided with pins for the reception of dough, and an ejector for the pretzels, said ejector forming a scraper for said pins.

24. In a machine for making pretzels, the combination with a movable member, of a holder carried by said member, clamping means for a pretzel carried by said holder, releasing means for said clamping means, an ejector for discharging the pretzel from the holder after the release of said clamping means, and means for imparting to said ejector a series of impulses to discharge each pretzel.

25. In a machine for making pretzels, the combination with a movable member, of a holder carried by said member, clamping means for the pretzel carried by said holder, releasing means for said clamping means, an ejector for discharging the pretzel from the holder after the release of the clamping means, and a toothed cam for imparting to said ejector a series of impulses to discharge each pretzel.

26. In a machine for making pretzels, the combination with a movable member, of a holder carried by said member and adapted to carry a loop of dough, a frame pivoted to said holder, a clamping device rotatively carried by said frame, means for moving said clamping device through more than a complete rotation at each twisting operation, and means for imparting to said clamping device a retrograde movement equal to the over rotation.

27. In a machine for making pretzels, the combination with a movable member, of a holder carried by said movable member and adapted to hold a loop of dough, an ejector movable relatively to said holder, and means for variably limiting the movement of said ejector toward said holder.

28. In a machine for making pretzels, the combination with means for rolling the dough into cylindrical form, of an L-shaped finger adapted to form the cylinder of dough into a loop and hold the same in suspended position, and a holder moving upwardly past said finger and adapted to remove the loop of dough therefrom.

29. In a machine for making pretzels, the combination with means for rolling the dough into cylindrical form, of a pivoted L-shaped finger adapted to form the cylinder into a loop of dough and hold the same in suspended position, and a holder moving upwardly past said finger and adapted to remove the loop of dough therefrom.

30. In a machine for making pretzels, the combination with means for rolling the dough into cylindrical form, of a pair of tapered L-shaped fingers, said fingers being pivoted and adapted to form the cylinder of dough into a loop and hold the same in suspended position, and a holder moving upwardly between said fingers and adapted to remove the loop of dough therefrom.

31. In a machine for making pretzels, the combination with means for rolling the dough into cylindrical form, of a fork formed of inclined bent fingers for receiving the dough and forming it into a loop, a holder adapted to receive the loop from said fork and hold the same, and means for twisting the ends of the loop and folding the twisted ends over the body of the loop.

32. In a machine for making pretzels, the combination with a cylinder covered with wire netting, of a concave coöperating with said cylinder to roll the dough and also covered with wire netting, the netting of said concave being provided with a backing and made removable, and supporting stops carried by said concave and forming grooves for the reception of said netting and backing.

33. In a machine for making pretzels, the combination with means for twisting a loop of dough, of knives for severing the ends of the loop, said knives being provided with ends forming wearing surfaces to protect the edge.

34. In a machine for making pretzels, the combination with a holder, of a pivoted frame carried by said holder, a clamping device rotatably carried by said frame, a pair of fingers for holding the ends of the dough against said clamping device, and an auxiliary finger for supporting one of the ends.

In testimony whereof, I have hereunto set my hand and affixed my seal in the presence of the two subscribing witnesses.

GEO. H. SCHAETZEL. [L. S.]

Witnesses:
W. A. ALEXANDER,
ELIZABETH BAILEY.